United States Patent
Kulaga et al.

(10) Patent No.: US 12,265,619 B2
(45) Date of Patent: Apr. 1, 2025

(54) OPTIMAL ANTIMALWARE SIGNATURES DATABASE

(71) Applicant: Acronis International GmbH, Schaffhausen (CH)

(72) Inventors: Andrey Kulaga, Moscow (RU); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 461 days.

(21) Appl. No.: 17/656,876

(22) Filed: Mar. 28, 2022

(65) Prior Publication Data

US 2023/0306115 A1 Sep. 28, 2023

(51) Int. Cl.
*G06F 21/56* (2013.01)

(52) U.S. Cl.
CPC .......... *G06F 21/566* (2013.01); *G06F 21/565* (2013.01); *G06F 2221/034* (2013.01)

(58) Field of Classification Search
CPC ...... G06F 21/56; G06F 21/566; G06F 21/565; G06F 2221/034
See application file for complete search history.

(56) References Cited

U.S. PATENT DOCUMENTS

| | | | |
|---|---|---|---|
| 8,353,040 B2 | 1/2013 | Tahan et al. | |
| 8,561,193 B1 | 10/2013 | Srivastava et al. | |
| 9,147,073 B2 | 9/2015 | Zaitsev | |
| 9,665,713 B2 | 5/2017 | Avasarala et al. | |
| 9,769,189 B2 | 9/2017 | Mohaisen et al. | |
| 9,992,214 B1* | 6/2018 | Xiao | G06F 21/563 |
| 9,998,484 B1 | 6/2018 | Buyukkayhan et al. | |
| 10,235,521 B2 | 3/2019 | Zhang et al. | |
| 10,938,854 B2 | 3/2021 | Strogov et al. | |
| 11,106,792 B2 | 8/2021 | Kostyushko et al. | |
| 11,609,992 B2 | 3/2023 | Gryaznov et al. | |
| 11,611,586 B2 | 3/2023 | Strogov et al. | |
| 2008/0201779 A1 | 8/2008 | Tahan et al. | |
| 2017/0193229 A1* | 7/2017 | RoyChowdhury | G06F 21/564 |
| 2017/0262633 A1* | 9/2017 | Miserendino | G06N 5/025 |
| 2020/0293656 A1* | 9/2020 | Lakhotia | G06F 11/3604 |
| 2022/0207139 A1 | 6/2022 | Strogov et al. | |
| 2024/0028707 A1* | 1/2024 | Paul | G06F 21/53 |

FOREIGN PATENT DOCUMENTS

WO  WO-2012075336 A1 *  6/2012  ............. G06F 21/56

OTHER PUBLICATIONS

Introduction to Cyber Protection, https://www.acronis.com/en-us/support/documentation/CyberProtectionService/#cshid=44130.

* cited by examiner

*Primary Examiner* — Jayesh M Jhaveri

(74) *Attorney, Agent, or Firm* — ESPE Legal Consultancy FZ-LLC

(57) ABSTRACT

A method for creating a collection with optimized family-specific signatures for protecting from malware includes collecting statistics of potential signatures for chosen sample attribute vectors, the statistics of potential signatures being collected for clean files and malware files, estimating a probability to find a potential signature in the clean files, grouping malware files with the same signature in clusters (families), choosing the most optimal signature for the malware family files based on a predefined target function, and exporting a collection with optimized family-specific signatures configured to be implemented by scan engines.

20 Claims, 3 Drawing Sheets

OPTIMAL ANTIMALWARE SIGNATURES DATABASE

TECHNICAL FIELD

The present invention pertains to computer security, specifically to optimization of a process of identification of malicious files by optimizing a structure of a repository of known malware files using a signature-based approach.

BACKGROUND

To protect from the malware by applying signature technologies, conflicting requirements that should be fulfilled include coverage of all known (billions) of malware samples, low false positive rate, compact size of the repository of known malware files, fast scan time, and signature stability for new malware samples (i.e., the ability to identify new malware samples by an old signature).

A file signature is a set of file-specific data that can be checked locally on the device where the file resides and when checked against the antimalware database can provide at least one of the following verdicts: (1) the file is clean, no need for further inspection is needed, (2) the file is malicious and belongs to at least one of the malware families, or (3) the file is suspicious and additional inspection may be needed to determine if it is malicious or not.

A signature may be a static set of data or dynamic (e.g., behavior-based).

A signature may be based, among other things, on file metadata (e.g., size, creation date, or modification date), strings, binary sequences, and opcodes n-grams.

A signature creation process may include an application of a one-way function (e.g., a hash function), or error-detection functions (e.g., CRC16, CRC32, CRC64, MD5, SHA-1, SHA-256), or others.

Existing solutions create signatures manually by "try and test" methods, choosing some of the possible signatures and testing them on some limited collection of clean and malware samples.

The manual process is prone to errors: (1) it may include guessing, (2) it may not be optimal, and (3) may be prone to human operator errors.

Therefore, a better process of generation of signatures is needed that would be (1) automated, (2) related to a family of files instead of a single file, and (3) would utilize techniques that may allow automatic optimization.

SUMMARY

It is an exemplary aspect of the present invention to provide for a signature-based malware engine a collection of grouped signatures, each automatically selected (and possibly optimized) for its own group, that would meet conflicting requirements: (1) the ability to process a large number of clean samples and malware samples; (2) the ability to perform inspection within a short period of time; (3) the ability to operate in a "workstation" environment with limited computational capabilities; (4) relatively small in size; and (5) have a low false positive rate.

The present invention uses a large collection of attribute vectors (AV) including but not limited to metadata, partial contents, and behavioral characteristics of both clean and malware files to find potential signatures (based on subsets of AVs potentially combined with potentially other data and potentially with additional operations performed on part or all of the contents of the signature, for example, an application of a HASH function) and to find optimal signatures for families of malware.

The exemplary invention provides a system and a method for identifying signatures of families of clean and malware files for protection from malware.

The method includes (1) identification of potential subsets of AVs of a given collection of known clean and malware files that may constitute a potential signature (PS), (2) collecting statistics of different PSs for chosen sample AVs, (3) identify PSs with low false positive rate, (4) grouping files with identical or similar (Degree of Similarity—DoS can be defined in that case) values of selected PSs into families, (5) by using a predefined target function (e.g., a linear combination of weighted sum of signature sum, processing time, and statistical false positive rate), choosing an optimized family for the clean or malware family, and (5) exporting a version of an optimized antimalware collection with pre-set file families and related signatures configured to be implemented by scan engines.

The exemplary embodiment uses SQL language, its variant (e.g., T-SQL) or a similar structured query language to perform inspection of the collection of known clean and malicious files.

The exemplary embodiment also provides a system for creating a collection of optimized family-specific signatures for protection from malware.

The system includes a processor coupled to a memory that stores instructions.

The processor is configured to collect statistics of potential signatures utilizing different subsets of chosen sample attribute vectors (e.g., file metadata or contents), the statistics of potential signatures being collected for clean files and malware files, using statistics collected from the sample, estimate probability to find a potential signature in the clean files, group similar files with identical or similar signatures of the malware files in clusters from all potential sample attribute vectors, select a signature for each malware family files, using a predefined target function, choose the most optimal signature for the identified family of malware files, and export a version of an optimized antimalware collection configured to be implemented by scan engines.

The present system and method would result in creating an antimalware database with a priori quality metrics based on statistics of potential signatures for families of both clean and malware samples.

SUMMARY OF FIGURES

The exemplary aspects of the invention will be better understood from the following detailed description of the exemplary embodiments of the invention with reference to the drawings.

DETAILED DESCRIPTION

In order to create a grouped signature collection according to an exemplary embodiment, the following steps are implemented. Statistics of potential signatures for chosen sample attribute vectors (binary n-grams, strings, opcodes, etc.) are collected. Statistics are collected both for clean and malware samples. Probability is estimated to find out any potential signature in clean files. Malware files are grouped with the same or similar signature in clusters (families) to create a single signature for all files in the cluster (family). The most optimal signature for the identified malware file family is chosen based on a predefined target function that may be based on different values, such as the average amount of resources required to scan a file for the particular signature, the average size of the family; and the minimum size of the signature. A version of the optimized collection of family-specific signatures is exported to use by scan engines.

Exemplary embodiments of the present invention will now be described with reference to the drawings.

Figure 1:
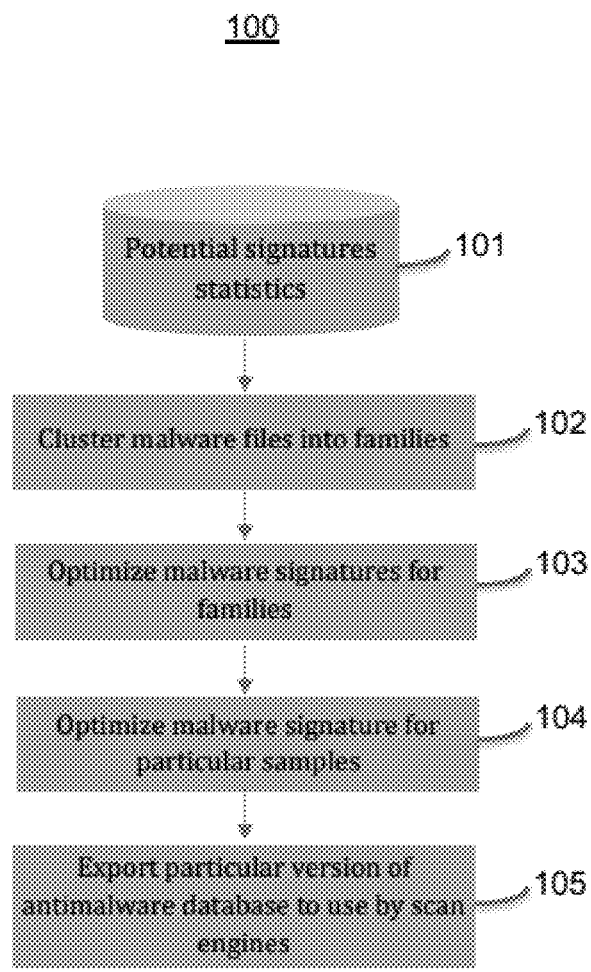
FIG. 1 shows an exemplary procedure for creating antimalware collection with optimized family-specific signatures according to an exemplary embodiment.

As shown exemplarily in FIG. 1, in the procedure 100, a significant collection of clean and malware samples is applied to create a statistical database which contains statistics of all possible strings or binary sequences.

A statistical database provides a reliable and measurable foundation to estimate the probabilities of false positives and the probability to have stable signatures for a family of malware.

In procedure 100, potential signatures statistics are collected for detection in step 101. The statistical database, which would contain all information for attributes vectors, would be applied for creating signatures. This could be binary and gram sequences, strengths, or assembly.

In step 102, malware files are clustered into families. A group of malware files is placed in clusters based on similarity of signatures, because in many cases, multiple versions of malicious files share the same codebase thus comprising a potential cluster (e.g., family).

In step 103, malware signatures for families are optimized by using a definition of cluster (e.g., family) and having the lowest false positive rate among all signatures available for the family. This creates a set of one or more signatures which would be used to detect all these files.

In step 104, malware signatures for particular samples are optimized by using a predefined target function. This allows making the database compact when one signature is used to detect all files of a particular family malware. Family and statistical databases of possible signatures that are collected previously allow the optimization of the process of signature creation to select a signature of minimal possible lengths for the malware.

Similarly, this signature required a number of false positives for clean files. This signature should be shared by all members of a particular malware family.

Finally, in step 105, a particular version of the optimized family-based signature repository is exported for use by scan engines.

Figure 2:
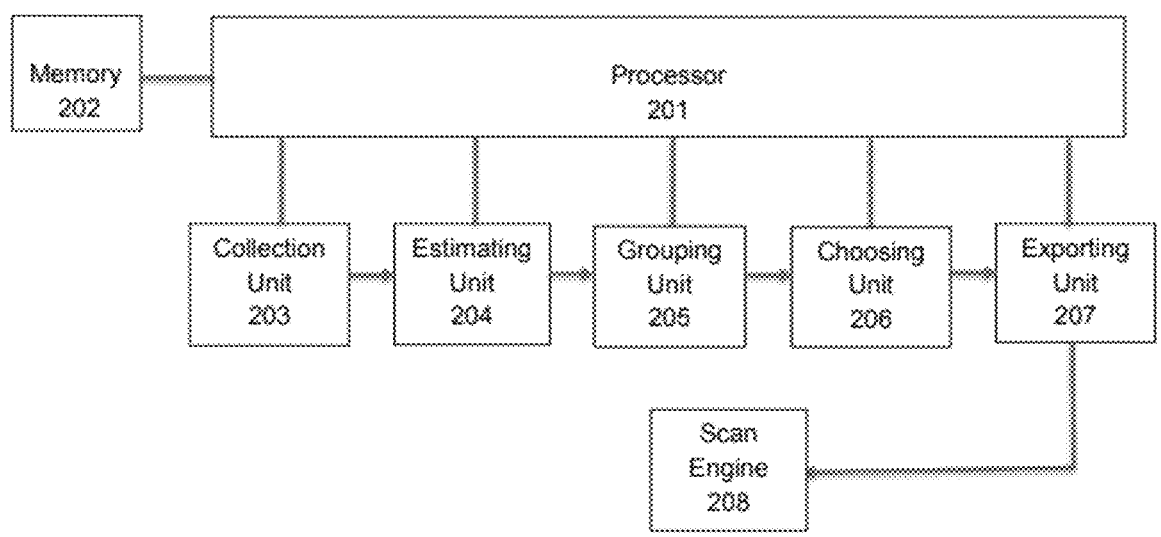
FIG. 2 shows an exemplary system for creating antimalware collection with optimized family-specific signatures according to an exemplary embodiment.

In an exemplary aspect, the system 200 shown in FIG. 2 creates an optimized collection of family-specific signatures for protection from malware.

System 200 includes a processor 201 of a computer coupled to a memory 202 that stores instructions that are implemented by the processor.

The processor 201 is configured to function as a collection unit 203 to collect statistics of potential signatures for chosen sample attribute vectors, the statistics of potential signatures being collected for clean files and malware files, an estimating unit 204 to estimate a probability to find a potential signature in the clean files, a grouping unit 205 to group similar files of the malware files in clusters to create a single signature for all malware family files, a choosing unit 206 to choose a most optimal signature for the malware family files based on probability estimates, and an exporting unit 207 to export a version of an optimized antimalware database configured to be implemented by scan engines 208.

Figure 3:
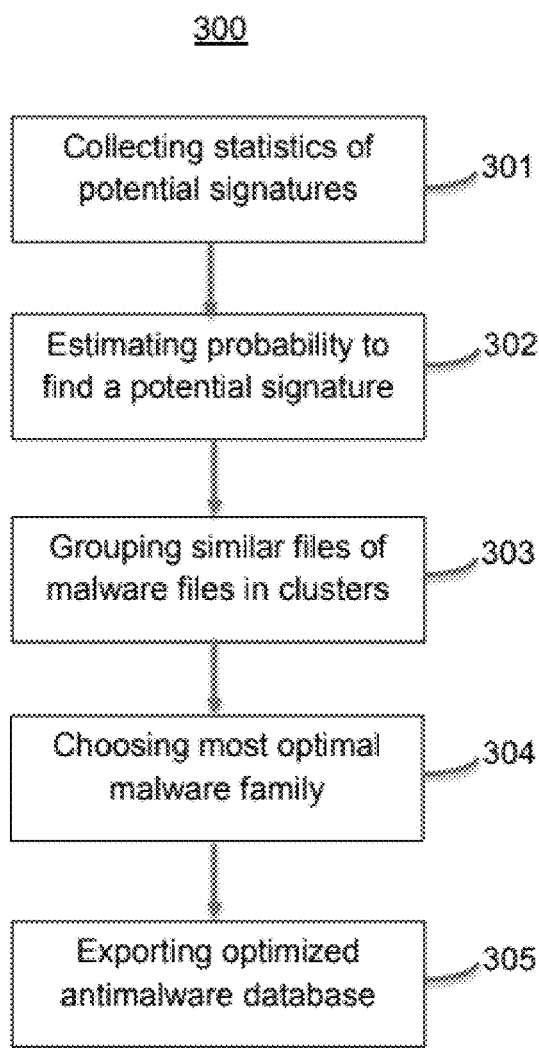
FIG. 3 shows an exemplary method for creating an antimalware collection with optimized family-specific signatures according to an exemplary embodiment.

In another exemplary aspect, FIG. 3 shows a method 300 for creating an optimized collection of family-specific signatures for protection from malware.

The method 300 includes, in step 301, using a sample of clean and malware files, collecting statistics (false positive rate, number of files identified by the same signature, etc.) of potential signatures for chosen sample attribute vectors, the statistics of potential signatures being collected for clean files and malware files, in step 302, estimating probability to find a potential signature in the clean files (e.g., false positive rate), in step 303, grouping similar files of the malware files in clusters (e.g., families) to create a single signature for all malware files in a family, in step 304, choosing a most optimal (e.g., with minimal false positive rate, or minimal signature size, or largest family size, or other performance parameter, or a function of these) signature for the malware family files based on a predefined target function, and, in step 305, exporting a version of an optimized collection of family-specific signatures configured to be implemented by scan engines.

Based on the system and method of the present invention, a collection of family-specific signatures meeting conflicting requirements for signature-based malware engines can be provided.

It is noted that multiple criteria can be considered for considering the optimal malware family.

The first potential criterion is the stability of the signature. That is, when some kind of signature is made and if there is a family, when new samples appear, this signature continues to work for new samples. In other words, a signature is created such that when new samples appear in the future, they still work with the signature and can be identified by the signature. Thus, based on the first criterion of stability of the signature for the new sampler of the family, new samples can be processed on an ongoing basis.

The second potential criterion is generalizability. That is, one compact signature should cover a large number of samples. To ensure that the base is compact, it is necessary to find a signature so that the entire family can be identified. There could be hundreds of thousands of these samples from multiple sources that are different, but they all belong to the same family. These samples can be identified with one signature.

The third potential criterion is the absence of false positives, or minimum given amount of volume. To avoid false positives preferably only signatures that have no overlap with white/clean files are considered. This is one of the reasons that a statistical base is selected to pick up a signature that is optimized to provide a small number of false positives.

Another criterion may be a function of several other criteria (e.g., performance and compactness). The compactness of each signature refers to its relative size, which may vary widely. In some circumstances, the signatures are selected for each file in the family. In that case, the shortest possible sequence that satisfies all other criteria should be identified.

The invention claimed is:

1. A method for creating an exportable digital collection of optimized malware family-specific signatures for protecting a computing system from malware, the method comprising:

providing a sample of files comprising known clean files and known malware files;

wherein the known clean files and malware files comprise a plurality of attribute vectors;

identifying signatures for the plurality of attribute vectors;

calculating, for each signature from among the signatures, a false positive rate by identifying the number of clean files with each said signature, and grouping malware files that share a signature in a family cluster;

from all the signatures in the family cluster, selecting a signature with the lowest false positive rate as a representative signature for the family cluster, wherein the representative signature is a first signature and a second representative signature is selected and wherein the second representative signature is selected using a predefined target function, wherein the predefined target function selects, as the second representative signature, the signature with the greatest probability to be found among all samples of the malware family cluster; and exporting the representative signature configured for use by a scan engine.

2. The method according to claim 1, wherein the predefined target function selects, as a second representative signature, the signature with the second lowest false positive rate and the greatest probability to be found among all samples of the malware family cluster.

3. The method according to claim 2, wherein the predefined target function further selects, as a third representative signature, the signature that requires the least amount of resources to scan a file for the signature.

4. The method according to claim 1, wherein the predefined target function further selects, as a second representative signature, the signature that requires the least amount of resources to scan a file for the signature.

5. The method according to claim 1, wherein the predefined target function further selects as a third representative signature, the signature that requires the least amount of resources to scan a file for the signature.

6. The method according to claim 1, wherein the representative signature is further selected by a predefined target function that rejects the signature with the lowest false positive rate when the average amount of resources required to scan a file for the signature exceeds a predetermined threshold.

7. The method according to claim 1, wherein the attribute vectors include at least one of binary n-grams, strings, or opcodes.

8. The method according to claim 1, wherein the sample further comprises statistics of all possible strings or binary sequences for the files in the sample.

9. A system for creating a collection with optimized family-specific signatures for protecting from malware, the system comprising:

a processor coupled to a memory storing instructions;

wherein the processor is configured to analyze a sample of clean and malware files, collect statistics of potential signatures for the clean and malware files as subsets of chosen attribute vectors, and calculate, for each potential signature, a false positive rate by identifying the number of clean files with that potential signature;

wherein the processor is further configured to group malware files that share a signature in a family cluster, and from all the potential signatures, to choose a representative set of signatures for the malware file family based on a predefined target function, wherein from among the representative set of signatures, a representative signature with the lowest false positive rate is selected from the family cluster as a first signature and a second representative signature is selected and wherein the second representative signature is selected using a predefined target function, wherein the predefined target function selects, as the second representative signature, the signature with the greatest probability to be found among all samples of the malware family cluster; and wherein the processor is further configured to export a version of the collection with optimized malware family-specific signatures configured to be implemented by a scan engine.

10. The system according to claim 9, wherein the predefined target function is configured to calculate a probability to find a signature in the clean files.

11. The system according to claim 10, wherein the predefined target function is further configured to calculate a probability to find a signature among all samples for a file of the malware family files.

12. The system according to claim 11, wherein the predefined target function is further to calculate an average amount of resources required to scan a file for the signature.

13. The system according to claim 10, wherein the predefined target function is further configured to calculate an average amount of resources required to scan a file for the signature.

14. The system according to claim 9, wherein the predefined target function is further configured to calculate a probability to find a signature among all samples for a file of the malware family files.

15. The system according to claim 14, wherein the predefined target function is further configured to calculate an average amount of resources required to scan a file for a signature.

16. The system according to claim 9, wherein the predefined target function is further configured to calculate an average amount of resources required to scan a file for a signature.

17. The system according to claim 9, wherein the attribute vectors include at least one of binary n-grams, strings, or opcodes.

18. The system according to claim 9, wherein the sample further comprises statistics of all possible strings or binary sequences for the files in the sample.

19. The method according to claim 1, wherein the predefined target function incorporates at least one of stability of the signature, generalizability of the signature, and overlap of the signature with clean files.

20. The system according to claim 9, wherein the predefined target function incorporates at least one of stability of the signature, generalizability of the signature, and overlap of the signature with clean files.

* * * * *